Dec. 15, 1959 LA VERNE B. RAGSDALE 2,917,350
SEAT ADJUSTING MECHANISM
Filed Sept. 24, 1956 2 Sheets-Sheet 1
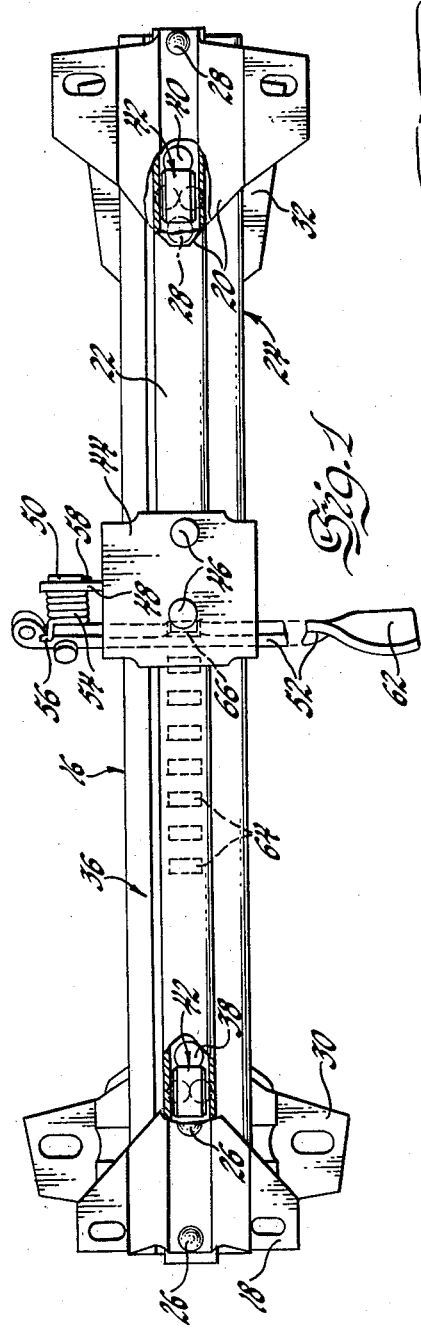
INVENTOR.
La Verne B. Ragsdale
BY
W. S. Pettigrew
ATTORNEY

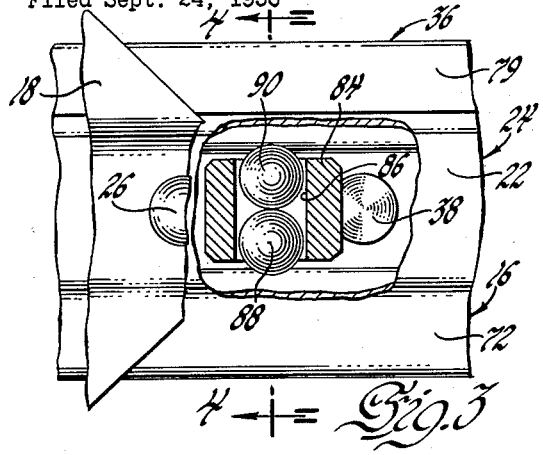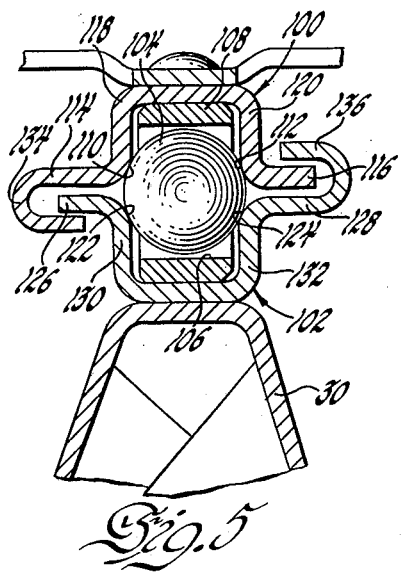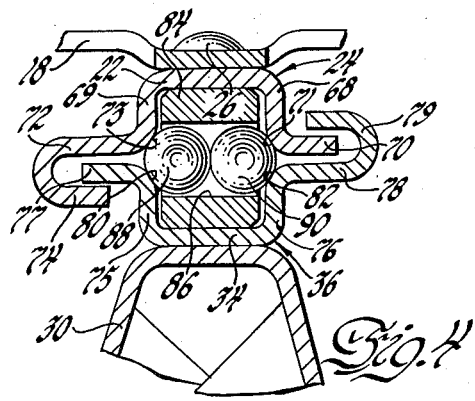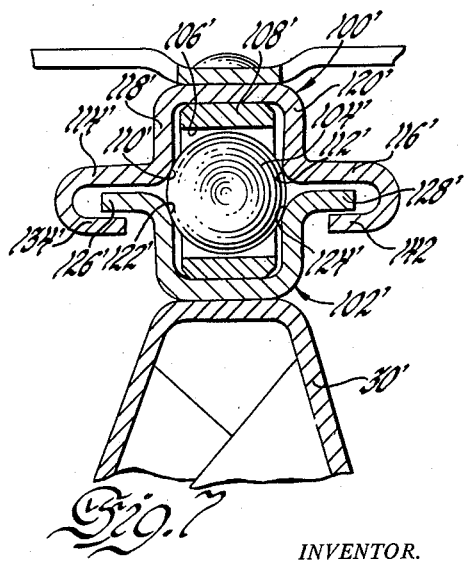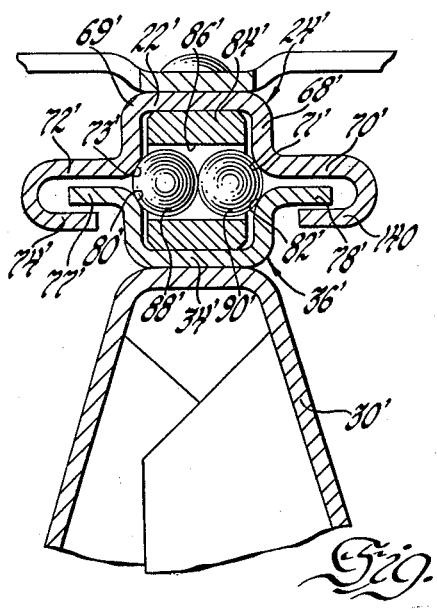

United States Patent Office 2,917,350
Patented Dec. 15, 1959

2,917,350

SEAT ADJUSTING MECHANISM

La Verne B. Ragsdale, Dearborn, Mich., assignor to General Motors Corporation, Detroit, Mich., a corporation of Delaware Application September 24, 1956, Serial No. 611,703

4 Claims. (Cl. 308—6)

This invention relates to seat adjusting mechanisms and more particularly to slide structures for vehicle seat adjusting mechanisms.

It is conventional to mount automobile seats within the body on spaced slide structures which support the set for horizontal fore and aft movement, with a locking mechanism being provided to hold the seat in any horizontally adjusted position. This invention relates to such slide structures and, in its preferred embodiments, provides new and improved ball and roller bearing assemblies for seat slide structures.

In many current production slide structures, the slide structure includes upper and lower opposed and relatively slidable channel members having spaced laterally extending flanges at the side walls thereof which are interlocked to prevent the channel members from being pulled apart. A pair of spaced ball bearings within the channel members are in point engagement with the base and side walls of each channel member to locate the members in spaced relatively slidable relationship and to take both vertical and lateral thrust loads.

One disadvantage of such structures is in the point engagement of the ball bearings with the base walls of the channel members. Since the ball bearings are harder than the channel members, the base walls become grooved and deformed. This disadvantage has been overcome in the past by providing one or more hardened leaf springs between the ball bearings and the base walls. However, this increases the cost of the slide structure both from a material and an assembly standpoint. Another disadvantage of such structures is in the relatively wide width and depth of the channel members required since the ball bearings must engage both the base and side walls of each channel member.

The seat slide structures of this invention are intended to overcome these disadvantages by providing new and improved ball and roller bearing assemblies which prevent grooving and deformation of the base walls of the channel members and also allow these members to be of a smaller size than currently required.

The primary object of this invention is to provide new and improved vehicle seat slide structures. A further object of this invention is to provide new and improved ball and roller bearing assemblies for vehicle slide structures. These and other objects of this invention will be readily apparent from the following specification and drawings wherein:

Figure 1 is a top plan view of one embodiment of a slide structure according to this invention, with parts thereof broken away for clarity of illustration;

Figure 2 is a side elevational view of the slide structure of Figure 1 with parts thereof broken away for clarity of illustration;

Figure 3 is an enlarged view of a broken away portion of Figure 1;

Figure 4 is a sectional view taken on the plane indicated by line 4—4 of Figure 3;

Figure 5 is a view similar to Figure 4 showing another embodiment of a slide structure according to this invention;

Figure 6 is a view similar to Figure 4 showing a further embodiment of a slide structure according to this invention; and Figure 7 is a view similar to Figure 5 showing yet another embodiment of a slide structure according to this invention.

Referring now particularly to Figures 1 and 2 of the drawings, a vehicle seat includes a seat bottom 10 and a seat back 12 mounted on a frame 14. Frame 14 is supported on the body for horizontal fore and aft adjustment by a spaced pair of slide structures 16. Only one such structure is shown and will be described, and it will be understood that the other structure is of the same construction.

Front and rear mounting brackets 18 and 20, respectively, are secured to seat frame 14 in a suitable manner and are riveted to the base wall 22 of the upper channel member 24 at 26 and 28, respectively, to secure the frame 14 to the upper channel member. Front and rear mounting brackets 30 and 32, respectively, are riveted to the base wall 34 of the lower channel member 36 at 38 and 40, respectively, and are secured to the vehicle floor pan (not shown) in a suitable manner as is well known in order to mount this member on the body. A pair of spaced ball and roller bearing assemblies 42 within the channel members locate the members in spaced relationship and slidably support the upper channel member 24 on the lower channel member to provide for horizontal adjustment of the seat.

In order to hold the seat in any horizontally adjusted position a locking mechanism is provided. A U-shaped bracket 44 is riveted to the base wall 22 of the upper channel member at 46. The inboard leg of bracket 44 has a portion 48 thereof lanced out and bent laterally with respect to the leg to provide a support for a pivot pin 50. A latch arm 52 is swingably mounted on pin 50 by peening over the end of the pin. A coil spring 54 encircling the pin has one end 56 bearing against the latch arm and the other end 58 bearing against portion 48 of bracket 44 in order to bias the latch arm upwardly or to latched position. The outboard leg of bracket 44 is provided with a slot 60 to receive the latch arm and the end of the latch arm is twisted at 62 to provide a handle portion. The lower channel member 36 is provided with a number of equally spaced slots 64 in the base wall 34 thereof. The latch arm 52 is provided with a laterally and upwardly extending lug 66 which is adapted to fit within any one of the slots 64 in order to hold the upper channel member in a horizontally adjusted position with respect to the lower channel member.

Referring now particularly to Figures 3 and 4 of the drawings, the upper channel member 24 includes the base wall 22 and a pair of opposed side walls 68 and 69. Wall 68 is provided with a laterally extending flange 70 which joins the wall on a curved juncture to provide an arcuate bearing surface 71. Wall 69 is similarly provided with a flange 72 which joints the wall on a curved juncture to also provide an arcuate bearing surface 73. Flange 72 further includes a return bent portion 74 to provide an interlock as will be described.

The lower channel member 36 is of the same shape as the upper channel member, including the base wall 34 and a pair of side walls 75 and 76. Wall 75 includes a flange 77 similar to flange 70 and received within the return bent portion 74 of flange 72 to interlock one side of the channel members. Wall 76 in turn includes a flange 78 provided with a return bent portion 79 which receives flange 70 to interlock the other side of the channel members. Flanges 77 and 78 join walls 75 and 76, respectively, on curved junctures to provide arcuate bearing surfaces 80 and 82, respectively.

By providing the upper and lower channel members of the same configuration, considerable expense is saved in tooling costs since the same dies or other metal working equipment may be used to produce both upper and lower channel members without any distinction therebetween. Such a seat slide structure is shown and claimed in application S.N. 499,819, Clark et al., filed April 7, 1955, and assigned to the assignee of the present invention.

The spaced ball and roller bearing assemblies 42 within the channel members locate the members in spaced relationship and support the upper channel member on the lower channel member for horizontal sliding movement. Since each assembly is the same, only one will be particularly described. A roller bearing 84 is received within the opposed channel members and bears against the base walls 22 and 34 thereof, respectively, in order to space the channel members. The diameter of the roller bearing 84 is greater than the combined depth of the channel members in order to space flanges 70 and 78 and flanges 72 and 77 with respect to each other so that there will be no contact between these flanges as the upper channel member slides relative to the lower channel member.

The outer bearing surface of roller bearing 84 bears against the base walls in surface engagement relationship so that the vertical load is distributed over a substantially larger area than in many current seat slide structures wherein ball bearings are used in a point engagement relationship with the base walls. By providing the roller bearing 84 which has a surface engagement relationship with each of the base walls, grooving and deforming of the walls are thereby avoided. Also no additional wear resistant means need be interposed between the roller bearing and the base walls and the cost of the slide structure is thereby substantially reduced.

The roller bearing 84 is provided with a central bore 86 and a pair of like ball bearings 88 and 90 are positioned within this bore. The ball bearings are spaced from the wall of the bore so as to be free to rotate independently of the roller bearing and have their center of rotation at the axis of rotation of the roller bearing. The ball bearings engage each other within bore 86 and each ball bearing also engages a bearing surface of one side wall of each channel member. Thus, ball bearing 88 engages bearing surfaces 73 and 80 of the upper and lower channel members, respectively, and ball bearing 90 engages bearing surfaces 71 and 82 of the upper and lower channel members, respectively. This engagement is a point engagement rather than a surface engagement as is the engagement of roller bearing 84 with the base walls of the channel members.

When the upper channel member 24 slides relative to the lower channel member 36 and also when the members are in a fixed horizontally adjusted position, it is intended that the roller bearing 84 take all of the vertical load and that the ball bearings 88 and 90 take only lateral thrust loads. However, due to manufacturing tolerances it may be that the ball bearings 88 and 90 will take some of the vertical load but in any instance the balls will remain spaced from the wall of bore 86 of the roller bearing so that the ball bearings and roller bearing will operate independently of each other. It is also intended that the channel members be preloaded with respect to a width-wise direction when they are assembled with ball bearings 88 and 90 to provide a non-rattling structure.

At least two of the ball and roller bearing assemblies 42 are provided between the upper and lower channel members, as can be seen in Figures 1 and 2. The rivets 26 and 28 and the rivets 38 and 40 are provided with enlarged heads inwardly of the channel members to provide forward and rearward limit stops for the ball and roller bearing assemblies.

The slide structures of this invention are of a smaller size than current slide structures wherein ball bearings are employed as the spacing members rather than ball and roller bearing assemblies. Since the ball bearings in current slide structures must engage all three bearing surfaces of each of the channel members, the points of engagement of the ball bearings with each of the members must lie in circles having their centers at the center of rotation of the ball bearings. This requires that the channel members be of a greater width and depth than the channel members of this invention.

The width of the roller bearings must only be large enough to support the vertical load of the seat without grooving or deforming of the base walls of the channel members and the diameter of the roller bearing must only be large enough to provide the axial bore which houses the ball bearings without weakening the ball bearing so that it cannot support the vertical load. The ball bearings need be only of a diameter so as to adequately engage the opposed thrust bearing surfaces of each channel member.

Referring now particularly to Figure 5 of the drawings, another embodiment of my invention will be described. The upper and lower channel members 100 and 102, respectively, are of substantially the same configuration as those shown and described in conjunction with the embodiment of Figures 3 and 4. In this embodiment only a single ball bearing 104 is provided. This ball bearing is positioned within a bore 106 of the roller bearing 108 in spaced relationship with the wall of the bore and has a center of rotation at the axis of rotation of the roller bearing. The ball bearing engages the bearing surfaces 110 and 112 provided by the curved junctures between the laterally extending flanges 114 and 116 and the side walls 118 and 120 of the upper channel member and also the bearing surfaces 122 and 124 provided by the curved junctures between the laterally extending flanges 126 and 128 and the side walls 130 and 132 of the lower channel member. Flange 114 has a return bent portion 134 to interlock with flange 126 and flange 128 has a return bent portion 136 to interlock with flange 116.

The roller bearing 108 has surface engagement with the base walls of the upper and lower channel members while the ball bearing has point engagement with the bearing surfaces 110, 112, 122, and 124. Since only a single ball bearing is used rather than a pair of ball bearings, the channel members 100 and 102 are of a greater depth than the channel members 24 and 36 of the embodiment shown in Figures 3 and 4 of the drawings. However, the channel members 100 and 102 are of substantially the same width as the channel members 24 and 36. The operation of the ball and roller bearing assembly shown in Figure 5 is the same as the operation of the assembly shown in Figures 3 and 4, and it is intended that a pair of such assemblies will be provided within the channel members.

Referring now particularly to Figure 6 of the drawings, another embodiment of my invention is shown. This embodiment is the same as that shown in Figures 3 and 4, except that the upper and lower channel members 24' and 36', respectively, are interlocked in a different manner. Thus, the flanges 68' and 69' of the upper channel member are provided with a return bent portion 74' and 140, respectively, which receives the lateral flanges 77' and 78', respectively, on the lower channel member to provide an interlock. Primed numerals indicate like parts and the operation of this embodiment is the same as that of the embodiment shown in Figures 3 and 4.

Still another embodiment of my invention is shown in Figure 7 of the drawings. This embodiment is the same as the embodiment shown in Figure 5, except that the upper and lower channel members 100' and 102', respectively, are interlocked in a different manner. The flanges 114' and 116' of the upper channel member are provided with a return bent portion 134' and 142, respectively, which receives flanges 126' and 128', respectively, of the lower channel member 102' to interlock the channel members. Like parts are indicated by primed numerals, and the operation of this embodiment is the same as that of the embodiment shown in Figure 5.

Thus, this invention provides new and improved ball and roller bearing assemblies for seat slide structures. The assemblies include a roller bearing in surface engagement with the bases of the channel members and one or more ball bearings positioned within an axial bore of the roller bearing in engagement with opposed bearing surfaces on the side walls of the channel members. By use of such assemblies, the channel members may be of a reduced size and no additional wear resistant means need be interposed between the roller bearings and the base walls of the channel members. The channel members may be interlocked in various manners, and a rattle-free structure is provided by pre-loading the channel members in a width-wise direction upon assembly of the channel members with the ball and roller bearing assemblies.

Although specific embodiments of my invention have been shown and described, various changes and modifications may be made within the scope and spirit of the invention.

I claim:

1. A slide structure comprising, in combination, a pair of longitudinal generally U-shaped relatively slidable channel members located in opposed spaced relationship, each of said members including a base providing a first bearing surface and a pair of like spaced side walls, each of said side walls having an arcuately shaped longitudinally extending shoulder located in opposed spaced relationship to each other to provide pairs of opposed arcuate bearing surfaces, roller bearing means within said channel members engageable with the first bearing surfaces thereof in surface bearing engagement therewith, said roller bearing means having a diameter greater than the combined depth of said members to locate said members in opposed spaced apart relatively slidable relationship and permit lateral movement of each member with respect to the other, and ball bearing means within said channel members having a diameter less than the diameter of said roller bearing means and being coaxially located with respect thereto, said ball bearing means having a point tangential engagement with each of said arcuate bearing surfaces to locate said channel members laterally with respect to each other, the distance between the tangential points of engagement of said ball bearing means with said pairs of opposed arcuate bearing surfaces being slightly greater than the normal distance between said same points on said same surfaces whereby said side walls of each channel member are preloaded with respect to each other by said ball bearing means.

2. A slide structure comprising, in combination, a pair of longitudinal generally U-shaped relatively slidable channel members located in opposed spaced relationship, each of said members including a base providing a first bearing surface and a pair of like spaced side walls, each of said side walls having an arcuately shaped longitudinally extending shoulder located in opposed spaced relationship to each other to provide pairs of opposed arcuate bearing surfaces, roller bearing means within said channel members engageable with the first bearing surfaces thereof in surface bearing engagement therewith, said roller bearing means having an axial bore therethrough opening to said opposed arcuate bearing surfaces and having a diameter greater than the combined depth of said members to locate said members in opposed spaced apart relatively slidable relationship and permit lateral movement of each member with respect to the other, and ball bearing means having a diameter less than the diameter of said roller bearing means and located within said bore coaxial with respect thereto, said ball bearing means having a point tangential engagement with each of said arcuate bearing surfaces to locate said channel members laterally with respect to each other, the distance between the tangential points of engagement of said ball bearing means with said pairs of opposed arcuate bearing surfaces being slightly greater than the normal distance between said same points on said same surfaces whereby said side walls of each channel member are preloaded with respect to each other by said ball bearing means.

3. A slide structure comprising, in combination, a pair of longitudinal generally U-shaped relatively slidable channel members located in opposed spaced relationship, each of said members including a base providing a first bearing surface and a pair of like spaced side walls, each of said side walls having an arcuately shaped longitudinally extending shoulder located in opposed spaced relationship to each other to provide pairs of opposed arcuate bearing surfaces, roller bearing means within said channel members engageable with the first bearing surfaces thereof in surface bearing engagement therewith, said roller bearing means having an axial bore therethrough opening to said opposed arcuate bearing surfaces and having a diameter greater than the combined depth of said members to locate said members in opposed spaced apart relatively slidable relationship and permit lateral movement of each member with respect to the other, and ball bearing means having a diameter less than the diameter of said bore and coaxially located within said bore in spaced relationship to the surface thereof, said ball bearing means having a point tangential engagement with each of said arcuate bearing surfaces to locate said channel members laterally with respect to each other and maintain said ball bearing means in spaced relationship to the surface of said bore, the distance between the tangential points of engagement of said ball bearing means with said pairs of opposed arcuate bearing surfaces being slightly greater than the normal distance between said same points on said same surfaces whereby said side walls of each channel member are preloaded with respect to each other by said ball bearing means.

4. A slide structure comprising, in combination, a pair of longitudinal generally U-shaped relatively slidable channel members located in opposed spaced relationship, each of said members including a generally flat base providing a first bearing surface and a pair of like spaced side walls, each of said side walls having an arcuately shaped longitudinally extending shoulder located in opposed spaced relationship to each other to provide pairs of opposed arcuate bearing surfaces, a roller bearing within said channel members having a width slightly less than the spacing of said side walls and a generally cylindrical outer surface engageable with said first bearing surfaces, said roller bearing having an axial bore therethrough opening to said opposed bearing surfaces and having a diameter greater than the combined depth of said members to locate said members in opposed spaced apart relatively slidable relationship and permit slight lateral movement of each member with respect to the other, and a spherical ball bearing having a diameter less than the diameter of said bore and coaxially located therein in spaced relationship to the surface thereof, said ball bearing having a point tangential engagement with each of said arcuate bearing surfaces to locate said channel members laterally with respect to each other and maintain said ball bearing in spaced relationship to the surface of said bore, the chordal distance between the tangential points of engagement of said ball bearing with said pairs of opposed arcuate bearing surfaces being slightly greater than the normal distance between said same points on said same surfaces whereby said side walls of each channel member are preloaded with respect to each other by said ball bearing.

References Cited in the file of this patent
UNITED STATES PATENTS

| | | |
|---|---|---|
| 946,439 | Hess | Jan. 11, 1910 |
| 1,342,541 | Johnson | June 8, 1920 |
| 1,877,486 | Brownlee | Sept. 13, 1932 |
| 2,299,928 | Potter | Oct. 23, 1942 |
| 2,622,940 | Johnson | Dec. 23, 1952 |